E. I. HEINSOHN & W. R. EDWARDS.
MACHINE FOR AND METHOD OF ELECTRIC WELDING.
APPLICATION FILED DEC. 4, 1911.
1,035,964.
Patented Aug. 20, 1912.
2 SHEETS—SHEET 1.
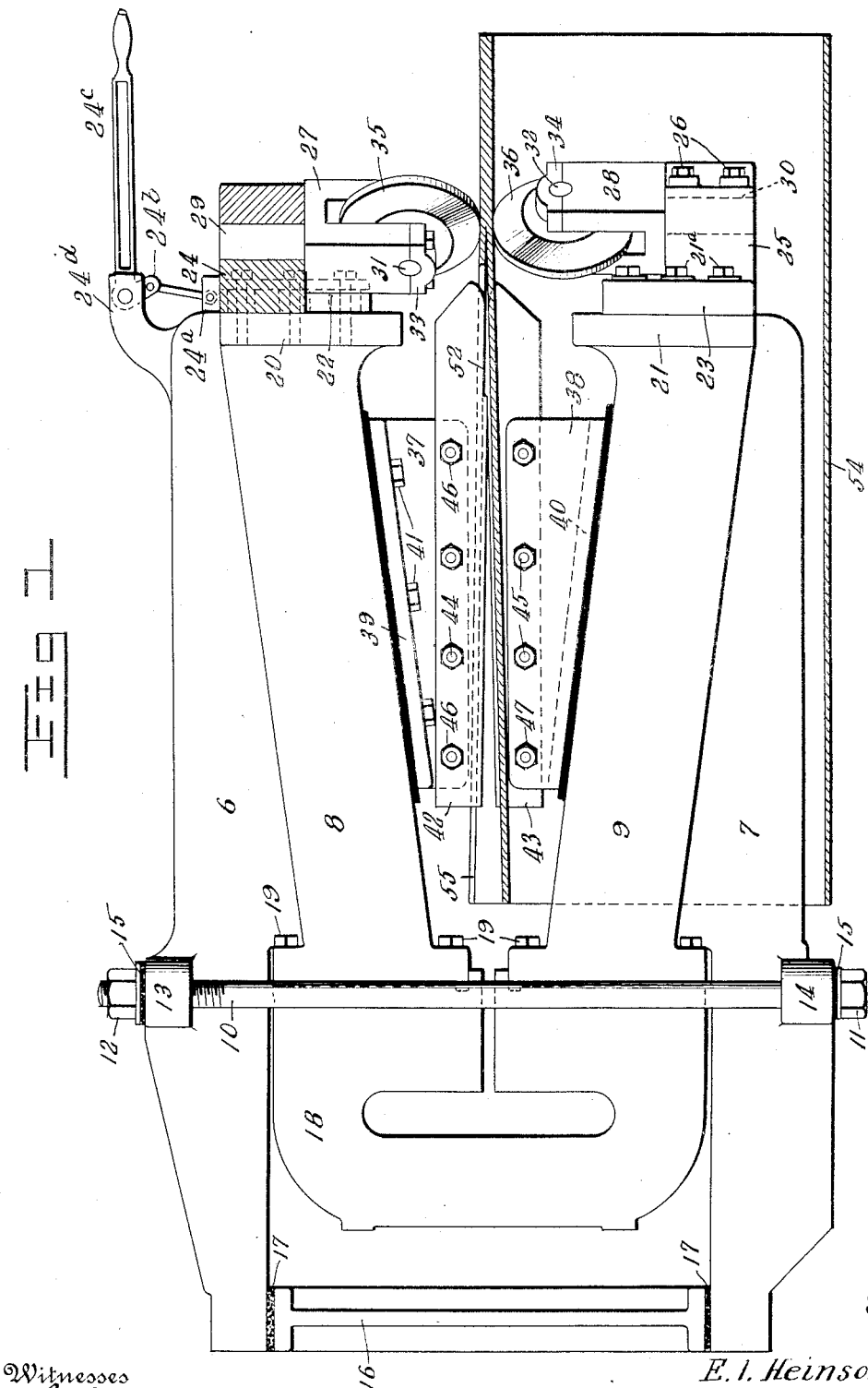
Witnesses
H. G. Robinette
Walton Harrison
Inventors
E. I. Heinsohn
W. R. Edwards
By Huggins, Cushman & Peg
Attorneys

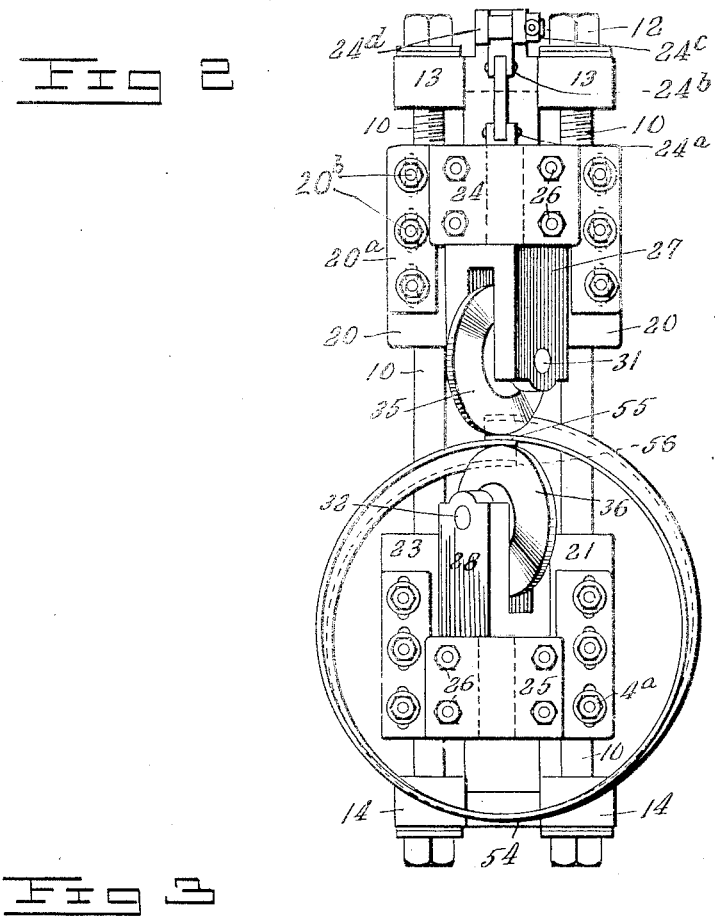
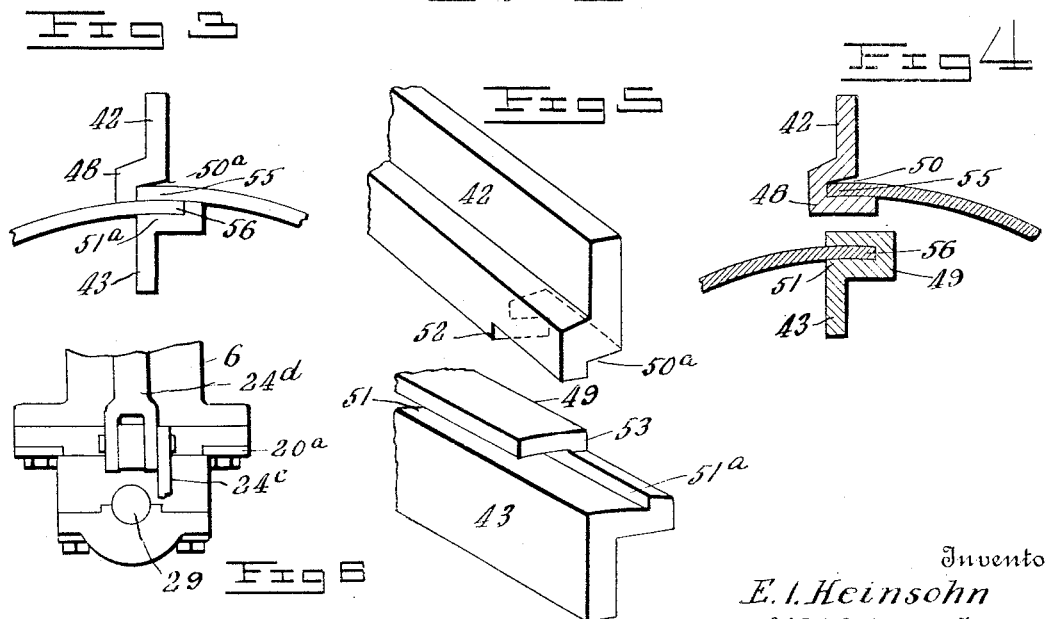

UNITED STATES PATENT OFFICE.

EDWIN I. HEINSOHN AND WILLIAM R. EDWARDS, OF CLEVELAND, OHIO, ASSIGNORS TO THE CLEVELAND WELDING & MFG. CO., OF CLEVELAND, OHIO, A CORPORATION OF OHIO.

MACHINE FOR AND METHOD OF ELECTRIC WELDING.

1,035,964.      Specification of Letters Patent.      Patented Aug. 20, 1912.

Application filed December 4, 1911. Serial No. 663,858.

*To all whom it may concern:*

Be it known that we, EDWIN I. HEINSOHN and WILLIAM R. EDWARDS, citizens of the United States, residing at Cleveland, in the county of Cuyahoga and State of Ohio, have invented new and useful Improvements in Machines for and Methods of Electric Welding, of which the following is a specification.

Our invention relates to electric welding and is adapted for general use and for various special uses, and comprehends both a method of welding and a machine peculiarly adapted for carrying out said method.

While no precise form of apparatus is essential to the practice of our method we find it convenient for the sake of simplicity and clearness to illustrate a single form of apparatus especially adapted for use in connection with our method.

Among the objects accomplished by our invention are the following: (1) To use revoluble electrodes journaled to turn in planes crossing each other and also crossing the general longitudinal path of travel of the stock to be operated upon, so that the rotation of the electrodes has a tendency to abrade the adjacent surface of the stock to be welded and thus prevent the formation of scale at the point where the heating current is applied to the stock, and also to cause the removal of any scale which may be present at said point. (2) To cause the revoluble electrodes when disposed as just stated to subject the portion of the stock at the point where the heating current is applied to a torque due to the rotation of the electrodes in opposite directions relatively to the general axis of travel of the stock, this torque tending to prevent the overlapping edges of the stock from springing apart or becoming otherwise misplaced when subjected to the heat and pressure peculiar to the action of the revoluble electrodes. (3) To enable the revoluble electrodes, by turning in planes crossing each other, while at the same time supplying current which passes directly through the overlapping edges of the stock, to thereby subject said overlapping edges to a mechanical pressure especially suitable for causing said overlapping edges to unite. (4) To enable the operator to adjust at will the relative direction of the planes in which the electrodes turn, or to adjust either of said planes independently of the other, and thus regulate the degree of the torque exerted by said electrodes, as used for different purposes upon different kinds of work or upon the same work operated under different conditions of speed. (5) To enable the revoluble electrodes, and especially when the same are employed for the purposes of producing a torque as above indicated, to coact with a pair of improved mandrel members, constituting a guide for the stock, in such manner that the torque produced by the revoluble electrode tends to maintain the stock in proper working relation to the guide and the guide tends to maintain the stock in proper position to be acted upon by the revoluble electrodes. (6) To enable one of the electrodes to be forced toward the other with any desired degree of pressure while either electrode is turning askew relatively to the piece of stock to be welded.

Aside from the main objects just mentioned we seek to provide a number of specific improvements of various kinds, the purpose of which is to increase the efficiency of welding machines in general, and of tube welding machines in particular.

Reference is made to the accompanying drawing forming a part of this application, and in which like letters indicate like parts.

In the drawing, Figure 1 is a view partly in side elevation and partly in section showing our improved invention as applied to a machine for lap welding tubes and other cylindrical bodies. Fig. 2 is a fragmentary front elevation of the same, showing the revoluble electrodes we employ and the manner in which the same are used. Fig. 3 is a detail showing in fragmentary elevation the front ends of the mandrel members for guiding the stock. Fig. 4 is a detail showing a cross section through the mandrel members and a portion of the stock guided by them. Fig. 5 is likewise a detail showing in perspective the front ends of the mandrel members. Fig. 6 is a detail showing the slide and its connections.

A pair of conductor bars 6, 7 are provided with massive portions 8, 9, and these portions are made of metal having low ohmic resistance, preferably copper. For the purpose of holding the conductor bars together we employ two tie rods 10 exactly alike, one of them being shown in Fig. 1. This tie rod is provided with a head 11 and is fitted with a nut 12, the portion adjacent to the nut being threaded for this purpose. The tie rod extends through ears 13, 14, integral with the conductor bars. Washers or bearing sleeves 15 of insulating material engage these ears and encircle the tie rod. Between the back ends of the conductor bars 6, 7 is disposed a back stay 16 which is insulated from the conductor bars by plates 17 of fiber or other appropriate insulating material.

Connected directly with the conductor bars by aid of bolts 19 is a transformer secondary conductor 18 which may have the usual C shape, or may be of any desired form. Associated with this secondary conductor is a primary winding (not shown) which may, if desired, be disposed inside of the secondary conductor as is often done in welding machines. Mounted upon the massive portions 8, 9 of the conductor bars and integral therewith are heads 20, 21. Mounted fixedly upon the head 20 are a pair of slide strips 20ª secured in position by aid of bolts 20ᵇ. These slide strips, together with the adjacent portions of the head 20, constitute a slide-way. Mounted within this slide-way, and movable relatively to the same is a slide 22 which carries a massive bearing 24. By aid of a pivot pin 24ª a toggle joint 24ᵇ is connected with the upper end of the slide. This toggle joint is also connected with a lever 24ᶜ which is journaled in the upper portion 24ᵈ of the conductor bar 6. By actuating the lever 24ᶜ the slide 22 may be raised or lowered, and by virtue of the toggle joint may be forced downwardly with considerable pressure. Any other suitable arrangement may be substituted for moving the slide upwardly and outwardly, a steady weight being employed for this purpose if desired. To give the slide freedom of movement it is provided with slots through which the bolts 20ᵇ extend.

Adjustably mounted upon the head 21 by aid of the bolts 21ª is a base 23 provided with a massive bearing 25, this bearing being similar to the bearing 24 above described. These bearings are made in halves, which are held together and rendered adjustable by aid of the bolts 26. Two hangers 27, 28 are provided, each having substantially the form of a massive fork and being provided with cylindrical stems 29, 30 integral with the forks and extending through the respective bearings 24, 25. The hangers 27, 28 are provided with bearings 33, 34, and extending through the latter are shafts 31, 32, each shaft carrying a revoluble electrode 35, 36. Each of these electrodes has the form of a wheel thicker at its middle portion than at its outer peripheral edge. The operator by loosening the bolts 26 can adjust the hangers 27, 28, or either of them as desired, and by tightening the bolts the hanger or hangers will remain firmly in position as adjusted. This adjustment of the hangers enables the operator to bring the revoluble electrodes into the same plane, or to adjust them to different angles so that they rotate in planes crossing each other. In some instances it may be desirable to have the electrodes turn in the same plane, but in most cases we prefer to set them so that their planes cross each other and also cross the general direction of the axis of the work operated upon and in doing this to cross the general direction of travel of the work. If in working upon a particular kind of stock, or otherwise operating under special conditions, it is found that one of the electrodes should be set at a sharper angle than the other relative to the path of travel of the work, the operator may easily adjust either electrode to any angular position which he finds suitable for the purpose. If, therefore, it happens in a particular case that, through some unknown cause, one of the revoluble electrodes fails to balance the other so that the work binds upon the guide, or has a tendency to travel awry, this may, in a measure at least, be corrected by an appropriate relative adjustment of the hangers 27, 28.

We provide two supporting plates 37, 38, each having a base 39, 40 integral with and secure these two supporting plates upon the conductor bars 8 by aid of bolts 41 for the purpose. Mounted upon the supporting plates are two mandrel members 42, 43 which are held in position by aid of bolts 44, 45, and nuts 46, 47. The mandrel member 42 has a form which may be readily understood from Figs. 1, 3 and 4. It is a plate bent laterally and then bent back upon itself, so as to have a crease 48, see Fig. 4, and a slot 50. The upper wall of this slot, as will be understood from this figure, is inclined slightly in relation to the lower wall, and the latter has a slight curvature. The mandrel member 43 is bent laterally to the right, according to Fig. 4, and then bent back upon itself so as to form a crease 49 and a slot 51. The mandrel member 42 is cut away at its lower front end, as will be understood from Fig. 5, so as to leave a shoulder 52. The mutilation thus formed merges into the adjacent portion of the slot 50, and the slot, in consequence, has the form indicated at 50ª in this figure. Somewhat similarly the mandrel member 43 is cut away at its top front portion, as will be understood from Fig. 5, so as to leave a shoulder 53, the slot 51 at its front end now having the appearance indicated at 51ª in this figure. A piece of stock— in this instance a cylindrical blank—is shown at 54, and is provided with overlapping edges 55, 56, these being the edges to be welded.

It will be noted from Fig. 1 that the mandrel members 42, 43 are inclined relatively to each other and practically converge to a point. This feature, taken in connection with the cutting away of the adjacent ends of the mandrel members where they are closest together, enables the edges of the tubular blank to be brought into perfect mechanical engagement before they leave the mandrel member, and, consequently, before they are brought to the electrodes.

The operation of the device is as follows. The parts being arranged as above described, the operator adjusts the hangers 27, 28 as indicated so that the revoluble electrodes 35, 36 occupy planes crossing each other and also crossing the general path of travel provided for the stock. The cylindrical blank 54 is next placed in position so that its overlapping edges, adjacent to its outer or front end, is between the electrodes. The operator now grasps the lever 24ᶜ and by drawing it downwardly forces the electrode 35 downward with any desired degree of pressure upon the stock. The electric current being turned on, the stock or cylindrical blank is drawn to the right according to Fig. 1. For his purpose a pair of clamps of any appropriate form may be connected with the outer end of the piece of stock. As the blank, or piece of stock, is thus pulled to the right the electric current passes through the electrodes 35, 36, and also through the intervening overlapped edges of the stock, and the heat produced by the current effectively welds these edges together. The electrodes being set at proper angles relatively to the path of travel of the stock are turned by the motion of the stock, but at the same time exert a dragging action upon the latter. This action causes the abrasion of the adjacent surfaces of the stock in direct contact with the electrodes and tends to prevent the formation of scale upon these surfaces as well as to remove any scale which happens already to be present or which is unavoidably formed. It will be noted that each electrode, being driven by the stock, turns in a path askew relatively to the path of travel of the stock, and thus necessarily exerts a torque upon the portion of the stock in immediate engagement with the electrode. This torque performs not only the purpose just indicated, to wit, keeping the surface of the stock free as practicable from scale, but also applies to the stock a kind of pressure especially suitable for forming the weld.

We have found, in practice, that where a tubular piece of stock is to be welded by aid of revoluble electrodes arranged as has heretofore been customary in this art, the rotation of the electrodes as well as the heating effect of the current has a tendency to cause the overlapping edges of the stock to move laterally apart, so that there is a tendency for the edges to diverge, and even to separate entirely. With the revoluble electrodes arranged and adjusted as above described, however, the torque produced by them is utilized for counteracting this tendency of the overlapping edges to move laterally, the net result being that the overlapping edges are held substantially in proper position relatively to each other, and any guiding means employed need not exert any very great pressure upon the stock in order that its edges may be maintained in proper relative position for welding. The mandrel members 42, 43, however, are especially adapted for guiding the edges of the stock with exceptional accuracy. The edge 45 fits deeply into the slot 51, and the edge 55 enters the slot 50, but is not held so snugly therein as is the case with the edge 56 in the slot 51. The operator by pressing gently upon the stock at a point adjacent to the slot 50 can, to some extent, at will, shift the position of this portion of the stock, the inclined upper wall of the slot facilitating this purpose. As the slots 50, 51 are inclined relatively to each other, as indicated in Fig. 1, the work of the mandrel members 42, 43 is to gradually bring the overlapping edges of the stock closer together and finally press them into actual contact at the point where they are engaged by the revoluble electrodes. The shapes given to the adjoining portions of the mandrel members 42, 43, at the outer ends thereof, as indicated in Fig. 5, serve the purpose of bringing the overlapping edges of the stock completely into engagement at points located between the mandrel members; that is to say, the portion 50ª of the slot 51, and the portion 51ª of the slot 50 are brought so close together, as indicated in Fig. 3, that the edges of the stock in following the slots are not merely brought into close proximity, but are placed in actual engagement at a particular point before this point reaches the mandrel members. The revoluble electrodes, therefore, take hold the work at a point where the overlapping edges are already touching each other, and under these conditions the revoluble electrodes have normally but little to do except to supply the current and to produce the torque as above described and for the purposes stated.

As may be readily seen from the foregoing remarks, there is a peculiar coaction between the revoluble electrodes and the mandrel members, to the extent that if the mandrel members fail to bring the overlapping edges of the stock into proper position for welding, the revoluble electrodes tend, to a corresponding extent, to correct the position of the stock. To the extent that the revoluble electrodes are unable to maintain the stock in proper position, or to correct its false position, to a corresponding extent the mandrel members are called upon to properly feed the stock. If the mandrel members are unable to prevent the overlapping edges of the stock from slipping or moving relatively to each other, especially after the stock clears the mandrel members, the revoluble electrodes, by producing the peculiar torque above described, tend to prevent a threatened displacement of the overlapping edges or even to correct such displacement after it has occurred but before the edges are actually and completely welded. It will be also noted that the operator is enabled at will to apply any desired degree of pressure to the tank or stock by forcing the upper electrode downwardly upon the same, notwithstanding the fact that both electrodes may be disposed askew relatively to the general direction of the weld. No matter, therefore, whether the pressure of the electrodes be great or small, and no matter to what extent such pressure may be varied, the abrasive effect of the electrodes upon the stock is maintained and is controlled, quantitatively in a measure at least, by the degree of pressure applied.

We do not limit ourselves to the use of any particular materials in the construction of the machine here shown and described, nor to any special purpose for which said machine may be employed. Neither do we limit ourselves to the precise method employed except as indicated in our claims.

What we claim is:—

1. The herein described method of electric welding which consists in bringing into contact the edges of a substantially tubular blank to be welded, and subjecting said edges to the conjoint action of a torque and a heating current, applied at the same point and at the same moment to said edges.

2. The herein described method of electric welding which consists in bringing together the portions of stock to be welded, feeding said portions past a single work point where a heating current is supplied to the stock, and subjecting said portions to torque applied thereto only at said single point where said current is thus supplied to the stock.

3. The herein described method of electric welding which consists in bringing together the edges of a substantially tubular blank to be welded, feeding said edges longitudinally past a definite work point where a heating current is supplied to them, and abrading the surfaces of said edges as they are fed past said work point.

4. The herein described method of electric welding which consists in overlapping the edges of a substantially tubular blank to be welded, feeding said edges thus overlapped longitudinally past a single work point where a heating current is sent through them, and applying to said edges, at the exact point where the current enters them, two separate and contrary forces tending to press said edges laterally in opposite directions.

5. The herein described method of electric welding which consists in bringing into engagement the edges to be welded, subjecting said edges to the conjoint action of a torque and a heating current supplied at the same point and at the same time to said edges, and controlling, at the will of the operator, the angular direction in which said torque is applied.

6. The herein described method of electric welding which consists in bringing into contact the portions of stock to be welded, feeding said portions past a definite work point where a heating current is supplied to the stock, subjecting said portions to torque applied at the same point where said current is thus supplied to the stock, and adjusting, at the will of the operator, the direction of the angle of said torque relatively to the path of travel of the stock.

7. The method herein described of electrically welding tubular bodies, which consists in lapping the edges of a tubular blank, guiding said edges of said blank into contact with each other, causing said edges thus brought into contact to travel past a definite work point, supplying a heating current to said edges at said work point as said edges travel past the latter, and applying to said edges directly at said work point a torque so directed as to prevent said edges from moving from the position into which they were guided before reaching said work point.

8. In a welding machine, the combination of a pair of electrodes, one of which is revoluble, means for feeding between said electrodes the stock to be welded so that said revoluble electrode turns as said stock is fed against its surface, and means controllable at the will of the operator for changing the position of the plane of revolution of said revoluble electrode relatively to the path of travel of the stock.

9. A welding machine comprising a pair of electrodes, one of which is revoluble, means for moving a piece of stock longitudinally in a definite direction relatively to said electrodes, and means controllable at the will of the operator for shifting bodily the angular position of said revoluble electrode relatively to the path of travel of said piece of stock.

10. A welding machine comprising means for advancing a piece of stock in the general direction of the length of the latter, a plurality of electrodes in juxta-position for engaging opposite sides of said piece of stock, one of said electrodes being revoluble upon an axis of its own, said axis of said revoluble electrode being disposed askew relatively to the general direction of travel of the stock for the purpose of enabling said revoluble electrode to abrade the surface of said stock and to exert a torque thereupon as said stock is moved past said revoluble electrode.

11. A welding machine comprising means for advancing a piece of stock in the general direction of the length of the latter, a plurality of electrodes for engaging said piece of stock, one of said electrodes being revoluble upon an axis of its own, said axis of said revoluble electrode being disposed askew relatively to the general direction of travel of the stock for the purpose of enabling said revoluble electrode to abrade the surface of said stock and to exert a torque thereupon as said stock is moved past said revoluble electrode, and means controllable at the will of the operator for adjusting the axis of said revoluble electrode to different angles relative to the path of travel of said stock.

12. A device of the character described comprising a guide for directing a tubular blank along a definite path of travel, a pair of revoluble electrodes disposed adjacent to said path of travel for the purpose of engaging said tubular blank and supplying a heating current thereto, and means controllable at the will of the operator for adjusting independently of each other the angular position of said revoluble electrodes relatively to the general direction of said path of travel.

13. An electric welding machine comprising a guide for a tubular blank, a plurality of revoluble electrodes disposed adjacent to said guide, each of said electrodes having the form of a wheel provided with a thin peripheral edge and a thicker middle portion, and means controllable at the will of the operator for adjusting said wheels independently of each other to different angles relatively to said guide.

14. In a welding machine, the combination of a pair of electrodes and a pair of mandrel members extending toward said electrodes, each of said mandrel members being provided with a slot for receiving the edge of a blank to be welded, and separate supports for said mandrel members.

15. An electric welding machine comprising a pair of conductor bars, electrodes mounted thereupon, supporting plates mounted upon said conductor bars, and mandrel members mounted upon said supporting plates, each mandrel member being provided with a slot, the slots extending in substantially opposite directions and being adapted to receive the respective edges of a tubular blank.

16. A welding machine comprising a pair of electrodes, a pair of mandrel members extending toward said electrodes, said mandrel members being respectively provided with slots for guiding the edges of a blank, said mandrel members being cut away at points adjacent to said electrodes for the purpose of bringing together the edges of the blank to be welded before said edges leave the slots, and means for supplying current to said electrodes.

17. An electric welding machine comprising a pair of electrodes, means for supplying current thereto, a pair of mandrel members each provided with a slot, said mandrel members being so positioned that said slots converge practically to a point for the purpose of guiding into engagement with each other the opposite edges of a tubular blank.

18. A welding machine comprising a pair of conductor bars, electrodes connected therewith, supporting plates mounted upon said conductor bars, a pair of mandrel members, each detachably mounted upon one of said supporting plates, each mandrel member being provided with a slot for receiving one edge of a tubular blank to be welded.

19. A welding machine comprising electrodes and a mandrel member disposed adjacent to said electrodes and extending toward the same, said mandrel member being provided with a slot for receiving an edge of a tubular blank to be welded, said slot having an inclined wall to enable the operator to readily shift the position of said blank as its said edge travels through said slot.

20. A welding machine comprising mandrel members, each provided with a slot for receiving an edge of a tubular blank, said mandrel members being so positioned that said slots are inclined relatively to each other to facilitate bringing opposite edges of said tubular blank into engagement, said mandrel members being of considerable length relatively to the length of the tubular blank to be welded in order to guide said blank throughout a substantial part of its length; and a pair of electrodes associated with said mandrel members and disposed adjacent to the portions thereof where said slots are closest together.

21. In a welding machine, the combination of electrodes and mandrel members associated therewith for guiding a tubular blank into engagement therewith, one of said mandrel members having the form of a plate bent back and forth upon itself so as to form a slot.

22. In a welding machine, the combination of electrodes and mandrel members associated therewith for guiding a tubular blank into engagement therewith, one of said mandrel members having the form of a plate bent back and forth upon itself so as to form a slot, said slot having inclined walls to facilitate the guidance of the work thereinto.

23. The herein described method of electric welding which consists in bringing into contact the edges to be welded, subjecting said edges to the conjoint action of a torque and a heating current applied at the same point and at the same moment to weld the edges and controlling at will the degree of said torque.

24. The herein described method of electric welding which consists in bringing into contact the edges to be welded, subjecting said edges to conjoint action of abrasion and a heating current applied at the same point and at the same moment to said edges, and controlling at will the degree of said abrasion.

25. A welding machine comprising a pair of electrodes, one of which is revoluble, means for holding a piece of stock longitudinally in a definite direction relatively to said electrodes, mechanism for shifting bodily the angular position of said revoluble electrode relatively to the path of travel of said piece of stock, and means controllable at the will of the operator for forcing one of said electrodes toward the other with a predetermined degree of pressure while said electrodes are in action.

26. A welding machine comprising a pair of electrodes, one of which is revoluble, means for holding a piece of stock longitudinally in a definite direction relatively to the general position occupied by said electrodes, said revoluble electrode being disposed askew relatively to the path of travel of said piece of stock, and means controllable at the will of the operator for forcing one of said electrodes toward the other with any desired degree of pressure.

In testimony whereof we have hereunto set our hands in presence of two subscribing witnesses.

EDWIN I. HEINSOHN.
WILLIAM R. EDWARDS.

Witnesses:
G. E. GAGGI,
DON P. STROUPE.